(12) United States Patent
Mishra et al.

(10) Patent No.: US 11,487,743 B2
(45) Date of Patent: Nov. 1, 2022

(54) UPDATING SUBSCRIBER NODES WITH REPLICATION LOGS THAT INCREASE SCALABILITY

(71) Applicant: Hewlett Packard Enterprise Development LP, Houston, TX (US)

(72) Inventors: Soumya Sucharita Mishra, Santa Clara, CA (US); Kumaraguru Paramasivam, Santa Clara, CA (US); Pragna Hasthanthar Anand, Santa Clara, CA (US); Ganeshkumar Chittipedhi, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 318 days.

(21) Appl. No.: 16/520,272

(22) Filed: Jul. 23, 2019

(65) Prior Publication Data
US 2021/0026831 A1 Jan. 28, 2021

(51) Int. Cl.
*G06F 7/00* (2006.01)
*G06F 17/00* (2019.01)
*G06F 16/23* (2019.01)
*H04L 9/40* (2022.01)

(52) U.S. Cl.
CPC ...... *G06F 16/2365* (2019.01); *G06F 16/2358* (2019.01); *G06F 16/2379* (2019.01); *H04L 63/20* (2013.01)

(58) Field of Classification Search
None
See application file for complete search history.

(56) References Cited

U.S. PATENT DOCUMENTS 7,788,224 B2   8/2010  Fleck et al.
8,266,101 B1   9/2012  Shuai
9,854,038 B2 * 12/2017  Mandal ............... H04L 67/104
(Continued)

FOREIGN PATENT DOCUMENTS

CN          101714169        5/2010

OTHER PUBLICATIONS

Dampier, T., MongoDB: Replication Lag and the Facts of Life, (Web page), Mar. 19, 2013, 9 Pgs.
(Continued)

*Primary Examiner* — Tuan A Pham
(74) *Attorney, Agent, or Firm* — McDermott Will & Emery

(57) ABSTRACT

Various aspects of the subject technology relate to methods, systems, and machine-readable media for scaling a network security policy manager. The method includes receiving a stream comprising replication logs at a subscriber node, the replication logs comprising changes made to a publisher node that publishes contents to a plurality of subscriber nodes including the subscriber node, the replication logs streamed in response to changes being made to the publisher node. The method also includes replaying the replication logs at the subscriber node to update the subscriber node, wherein a replication lag is lower than a replay lag by a predefined threshold. The method also includes storing the replication logs on at least one remote server separately from the subscriber node to increase the scalability of updating the plurality of subscriber nodes, at least one remote server located geographically proximate to the subscriber node.

12 Claims, 5 Drawing Sheets

(56) References Cited

U.S. PATENT DOCUMENTS

| | | | |
|---|---|---|---|
| 2014/0129942 A1* | 5/2014 | Rathod | G06Q 50/01 |
| | | | 715/720 |
| 2014/0244191 A1* | 8/2014 | Oka | G01R 21/133 |
| | | | 702/61 |
| 2016/0259692 A1* | 9/2016 | Ramamurthi | G06F 11/1451 |
| 2018/0096068 A1* | 4/2018 | Venkataramanappa | |
| | | | G06F 11/2033 |
| 2019/0171650 A1* | 6/2019 | Botev | G06F 16/273 |

OTHER PUBLICATIONS

Otwell, J., PostgreSQL Streaming Replication vs Logical Replication, (Web Page), Aug. 23, 2018, 8 Pgs.

* cited by examiner

UPDATING SUBSCRIBER NODES WITH REPLICATION LOGS THAT INCREASE SCALABILITY

BACKGROUND

Network security policy managers can provide role and/or device based secure network access control for Internet of Things (IoT), bring your own device (BYOD), corporate devices, as well as employees, contractors and guests across any multi-vendor wired, wireless, and virtual private network (VPN) infrastructure. Network security policy managers may support a cluster mode operation to distribute authentication, authorization, and accounting (AAA) functionality among multiple nodes.

BRIEF DESCRIPTION OF THE DRAWINGS

The following detailed description references the drawings, wherein.

Figure 1A:
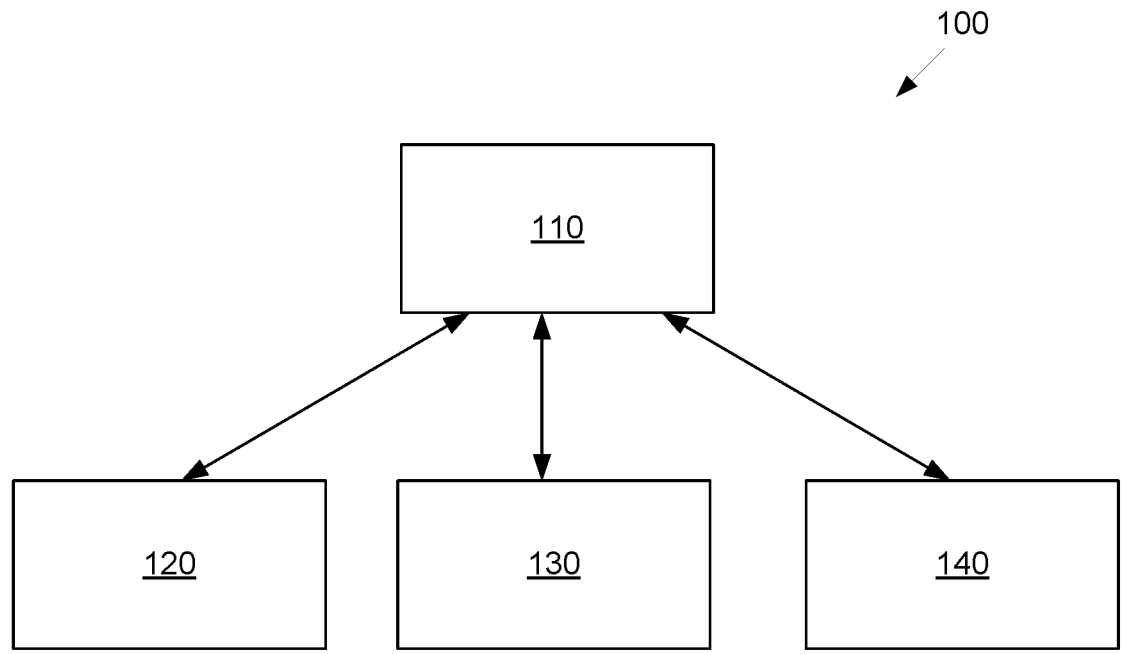
FIG. 1A illustrates an example publisher-subscriber system.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Network security policy managers provide authentication or transition and then accounting. For example, when a user with a device enters into a network, the network security policy manager first authenticates the device based on a local database that may include the user's authentication details, the user's credentials, and/or an active directory that may be user configured. Based on this information, the network security policy manager would authenticate the user.

Once the user is on the network, the network security policy manager monitors how the user utilizes resources over the network through accounting. The network security policy manager may also be configured to provide different levels of access to different users. For example, an employee may be given greater access to network resources than guest users. In this way, user activity may be monitored to ensure guest users do not receive access to confidential and/or proprietary information that is not authorized.

The network security policy manager may also be configured to enforce many such policies so that a network administrator can categorize the devices to specific user profiles based on factors such as whether the devices coming from a particular network or a particular email address. The user profiles may be granted different kinds of restrictions based on enforcement policies. This decides what kind of access the users have over the network.

In very large networks, it is desirable to distribute that workload amongst different network security policy manager servers in a cluster setup. For example, the network security policy manager supports a cluster mode operation to distribute the network security policy manager functionality among multiple nodes.

Conventionally, cluster mode operation is accomplished by maintaining one copy of configuration data in a configuration database of a master node, which is then replicated amongst slave nodes in a cluster using master-slave replication. The configuration database may include server specific information utilized for AAA and cluster mode operation. Session logs are stored in a separate log database that is local to each node.

The master node, whose configuration database data will be replicated to all slave nodes in the cluster is called the publisher, and the slave nodes are called subscribers. Publisher and subscriber nodes are assigned manually by a network administrator.

Currently, the network security policy managers may use a third party trigger based replication tool called Londiste to replicate publisher data across all subscriber nodes. For example, Londiste maintains a separate replication database that tracks every transaction made on the publisher database through PostgreSQL triggers. Londiste processes on the subscriber nodes poll the replication database to identify which transactions are to be replayed on their local database to maintain database consistency.

Current techniques also involve large transactions involving bulk commits that lead to frequent deadlocks in subscriber databases. This is especially problematic in cases where a majority of the authentications are handled by a few subscriber nodes. In large clusters (e.g., 10 or more nodes), recovering from such deadlocks takes several hours and has forced customers to disconnect from the cluster and re-join for faster recovery. The subscriber nodes also have the additional overhead of having to remotely connect to the publisher node for database synchronization. The network overhead, database replication, and active queries on subscriber nodes, leads to high input/output (I/O) wait times, which may cause the cluster to go out of sync.

Since replication is trigger based, there is also substantial lag between reflecting changes in the database from the publisher end to the subscriber end. This means that the subscriber is forced to make a remote database connection to the publisher for each sync. This additional overhead leads to high I/O wait times.

Additionally, every sync requires connecting to the publisher. This adds an additional workload of setting a remote connection whose performance depends on geographical distribution of the nodes in the cluster and network bandwidth.

Furthermore, there is the problem of having stale subscriber entries in the publisher replication database. For example, there may be situations where adding a new node to a cluster fails or an existing node becomes unavailable. This could be due to any number of reasons such as loss of network connectivity to the node, temporary overloading, etc. In such cases, the list of nodes in a cluster as reflected in the configuration database may not match the list of subscribers in the replication database as maintained by the publisher. This leads to the replication database containing stale node entries that no longer exist in the cluster list in the configuration database, and results in replication failures.

This disclosure describes a mechanism to scale network security policy managers. According to an aspect, replication lag is reduced on subscriber nodes, dependency on publisher nodes are reduced to maintain database consistency among nodes on a cluster, database deadlocks are reduced, and indexes are revisited to ensure updates do not cause bottlenecks. The technique improves upon problem areas of the network security policy manager in regards to scalability.

The disclosed methods, systems, and machine-readable media address a problem in traditional policy managers tied to computer technology, namely the technical problem of scaling AAA functionality among multiple subscriber nodes. The disclosed methods, systems, and machine-readable media solve this technical problem by providing a solution also rooted in computer technology, namely, by streaming replication rather than trigger-based replication, geographically distributing servers dedicated to Write Ahead Logs (WALs) closer to subscriber nodes, partitioning tables in configuration databases, and re-examining indexes.

The disclosed subject technology further provides improvements to the functioning of the computer itself because it improves performance, reduces network lag, and reducing latency.

FIG. 1A illustrates an exemplary publisher-subscriber system 100, according to some aspects. The system 100 may include a publisher node 110, a standby node 120, a first subscriber node 130, and a second subscriber node 140. The publisher node 110 may be communicatively coupled to each of the standby node 120, the first subscriber node 130, and the second subscriber node 140. The standby node 120 may be configured to be promoted to a publisher node in the event that the publisher node 110 fails. This prevents all the other nodes from failing as well.

According to aspects, the system 100 may include one publisher node 110 and one standby node 120. The standby node 120 may be assigned by a network administrator. While the publisher node 110 is healthy, the standby node 120 may operate the same as any of the other subscriber nodes 130, 140. The standby node 120 may also be configured to continuously ping the publisher node 110 to check whether it is able to connect to the publisher node 110, and make sure that this node has not failed.

According to aspects, the publisher node 110 may supply data to each of the standby node 120, the first subscriber node 130, and the second subscriber node 140. The data may then be applied at each of the standby node 120, the first subscriber node 130, and the second subscriber node 140. For example, the data may include configuration data.

It is understood that although two subscriber nodes are shown, more than two subscriber nodes may be included in the system 100 without departing from the scope of the disclosure.

Figure 1B:
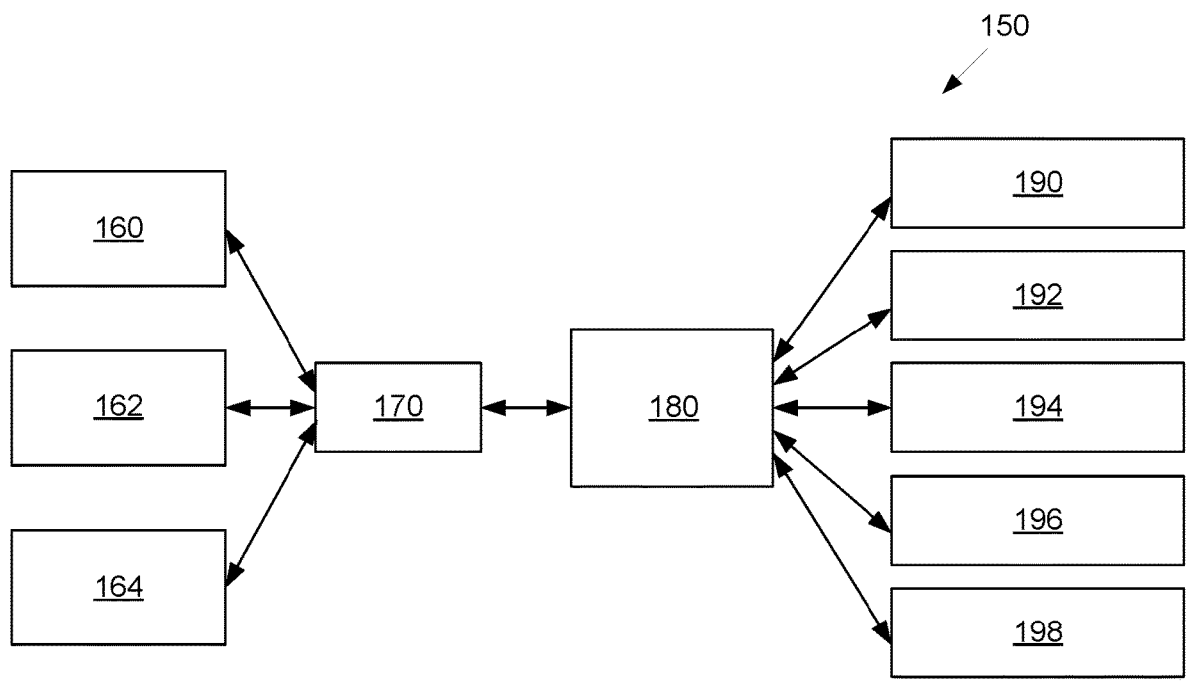
FIG. 1B illustrates an example network security policy manager system.

FIG. 1B illustrates an example network security policy manager system 150. The network security policy manager system 150 may include multiple devices (e.g., bring your own device (BYOD)) coupled to a network security policy manger 180 through a network 170. For example, the multiple devices may include employee devices 160, contractor devices 162, and guest devices 164. Each type of device may be assigned a different level of access by the network security policy manager 180.

The network security policy manager 180 may couple the devices 162-164 to a variety of applications 190-198. The applications may include network access management 190, application management 192, device management 194, visitor management 196, and device health 198. In this way, the network security policy manager 180 may enforce administrator created policies that extend across the network 170 to each device 160-164 for each application 190-198.

It is understood that although three categories of devices are shown, more than three categories of devices may be included in the system 150 without departing from the scope of the disclosure. Similarly, it is understood that although five categories of applications are shown, more than five categories of applications may be included in the system 150 without departing from the scope of the disclosure.

Figure 2:
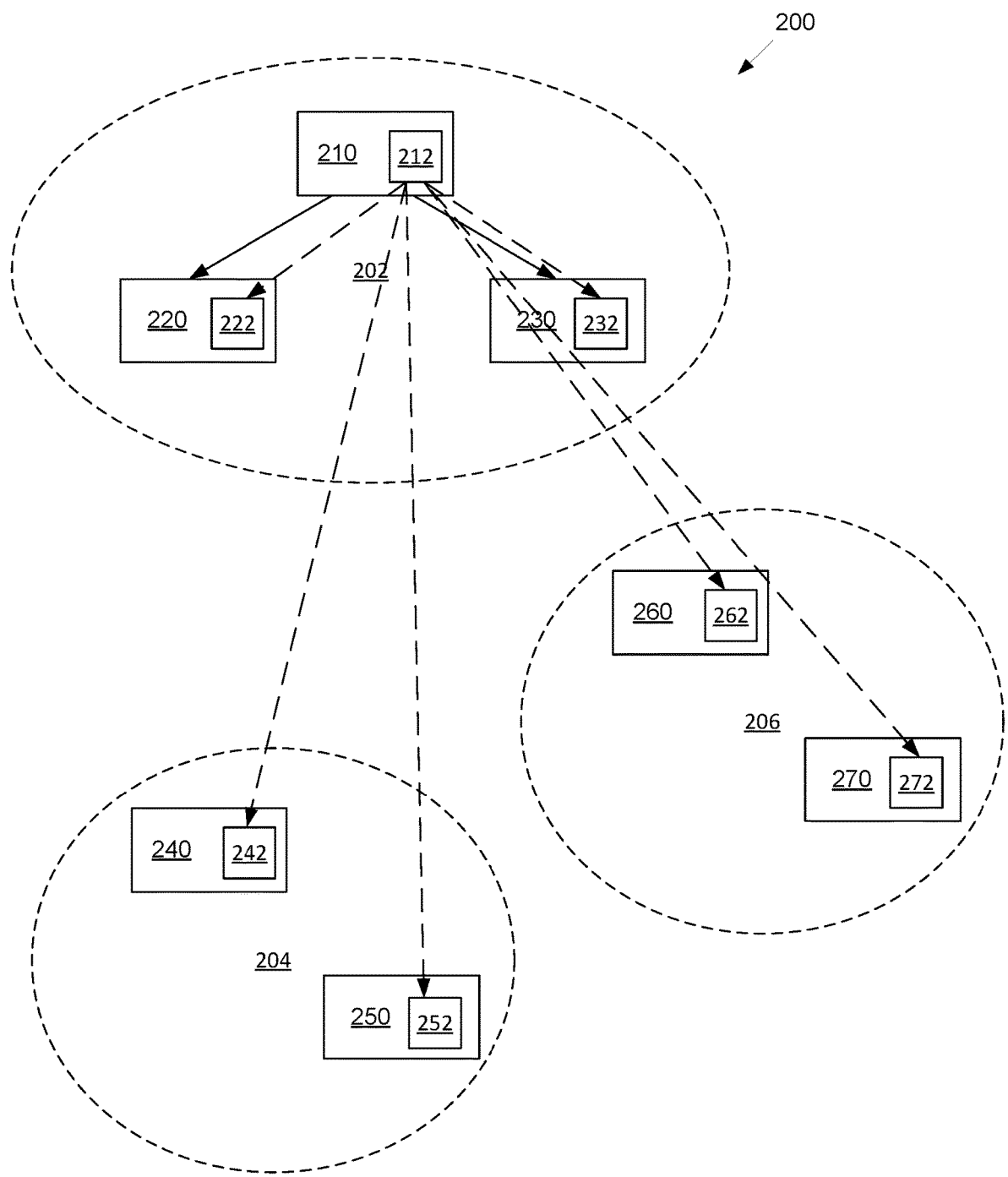
FIG. 2 illustrates an example cluster mode architecture.

FIG. 2 illustrates an exemplary cluster mode architecture 200, according to some aspects. The architecture 200 may include a first zone 202, a second zone 204, and a third zone 206. The first zone 202 may include a publisher node 210 having a publisher configuration database 212, a standby node 220 having a standby configuration database 222, and a first subscriber node 230 having a first subscriber configuration database 232. The publisher configuration database 212 may distribute configuration data directly to each of the standby configuration database 222 and the first subscriber configuration database 232.

The second zone 204 may include a second subscriber node 240 having a second subscriber configuration database 242 and a third subscriber node 250 having a third subscriber configuration database 252. The publisher configuration database 212 may distribute configuration data directly to each of the second subscriber configuration database 242 and the third subscriber configuration database 252.

Similarly, the third zone 206 may include a fourth subscriber node 260 having a fourth subscriber configuration database 262 and a fifth subscriber node 270 having a fifth subscriber configuration database 272. The publisher configuration database 212 may distribute configuration data directly to each of the fourth subscriber configuration database 262 and the fifth subscriber configuration database 272.

It is understood that although three zones are illustrated, more than three zones may be included without departing from the scope of the disclosure. It is further understood that each zone may include one or more subscriber nodes.

According to aspects, each commit to the publisher database may be written to a Write Ahead Log (WAL) on the publisher side. The changes are then reflected in real-time on the WAL on the subscriber nodes. The subscriber nodes replay WAL on their local configuration databases to maintain consistency. Since the subscriber primarily depends on its local copy of WAL for replication, this approach reduces the dependency on publisher nodes. For example, the subscriber may reference a local copy of database logs prior to querying a publisher database.

According to an aspect, replication lag may be reduced on subscriber nodes by streaming replication rather than trigger-based replication. For example, subscriber nodes should be able to replay database events without the need to connect with the publisher node frequently. This may be accomplished if the replication lag is significantly lower than the replay lag. To solve this issue, replication may be switched from trigger-based replication to streaming replication.

In an implementation, streaming replication may include streaming logs and applying all changes made to a master database to the subscriber database as soon as the changes occur, instead of waiting for periodic triggers (e.g., time ticks). The replay of database transaction logs (e.g., WAL logs) on the subscriber node may occur at different rates than for replication. This enables subscriber nodes to first reference their local copy of WAL logs for synchronization, before having to query the publisher database. This eliminates network backlog that occurs when replaying the WAL logs, because the subscriber node no longer has to communicate with the publisher node to make updates Additionally, because this process does not rely on time ticks, replication may occur at a different rate than replaying the event. CPU cycles and some disk cycles may be saved so that when the subscriber node is free (e.g., the subscriber node is not handling a lot of authentications), the subscriber node can continuously check the archive, perform a replay of whatever is happening on the publisher node, and then maintain its state to be the same as the publisher node. The subscriber node does not have to wait for a big chunk of records (e.g., based on time ticks) to be processed at the same time that the big chunk was processed on the subscriber node. It can happen later as well.

According to an aspect, dependency may be reduced on publisher nodes to maintain database consistency among nodes in a cluster. As a result, this would reduce network overhead and reduce I/O wait times. For example, a logical representation system, such as Pglogical, may be utilized to decouple a server from its WALs. Thus, the WALs need not be located on the same node on which the database changes have to be replayed. Rather, the WALs may be stored on a remote server from where the subscriber nodes can read the WAL entries and apply the changes to their local WALs. This can help increase availability by ensuring that the WAL is not lost if publisher goes down. Servers dedicated to WAL can then be geographically distributed such that they are closer to subscriber nodes to reduce network bandwidth.

According to additional aspects, database deadlocks may be reduced to improve performance and faster recovery in the case of sync issues. Because most deadlocks occur on large commits, certain tables in configuration databases that affect several records may be horizontally partitioned based on date-time ranges (e.g., through sharding). For example, cleaning known and unknown endpoints from configuration databases frequently leads to cluster instability, as cleanup can lead to deletion of millions of endpoints. Cleanup also causes competition among CPU and disk resources, which can only handle a limited number of transactions at a time. In the event of a deadlock (e.g., two processes competing for the same resource), a recovery process may terminate both competing processes so that the processes have to be tried again.

Sharding solves this problem by organizing (e.g., partitioning) the records. For example, the records may include attributes of user devices. These attributes may include device properties, time at which device was added to the database, time the device was first authenticated on the network, etc. Without partitioning, deleting the records would result in deadlocks because millions of records would need to be deleted. By partitioning, the records may be deleted based on certain attributes.

In some implementations, partitioning may be horizontal or vertical. For example, vertical partitioning may include dividing the database into vertical partitions by storing the records based on attributes, such as log data, session data, file size, etc. Horizontal partitioning may include dividing the database into horizontal partitions where each partition is time stamped and/or based on a condition.

According to aspects, indexes may be revisited to ensure updates do not cause bottlenecks. Indexing reduces query time, but also adds overhead in the event queries are inserted and/or updated if the column being updated is also indexed. This is because the change in value of the indexed column leads to re-evaluating existing indexes. Re-examining indexes on the configuration database may reduce the impact of overhead caused by re-indexing during replication.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
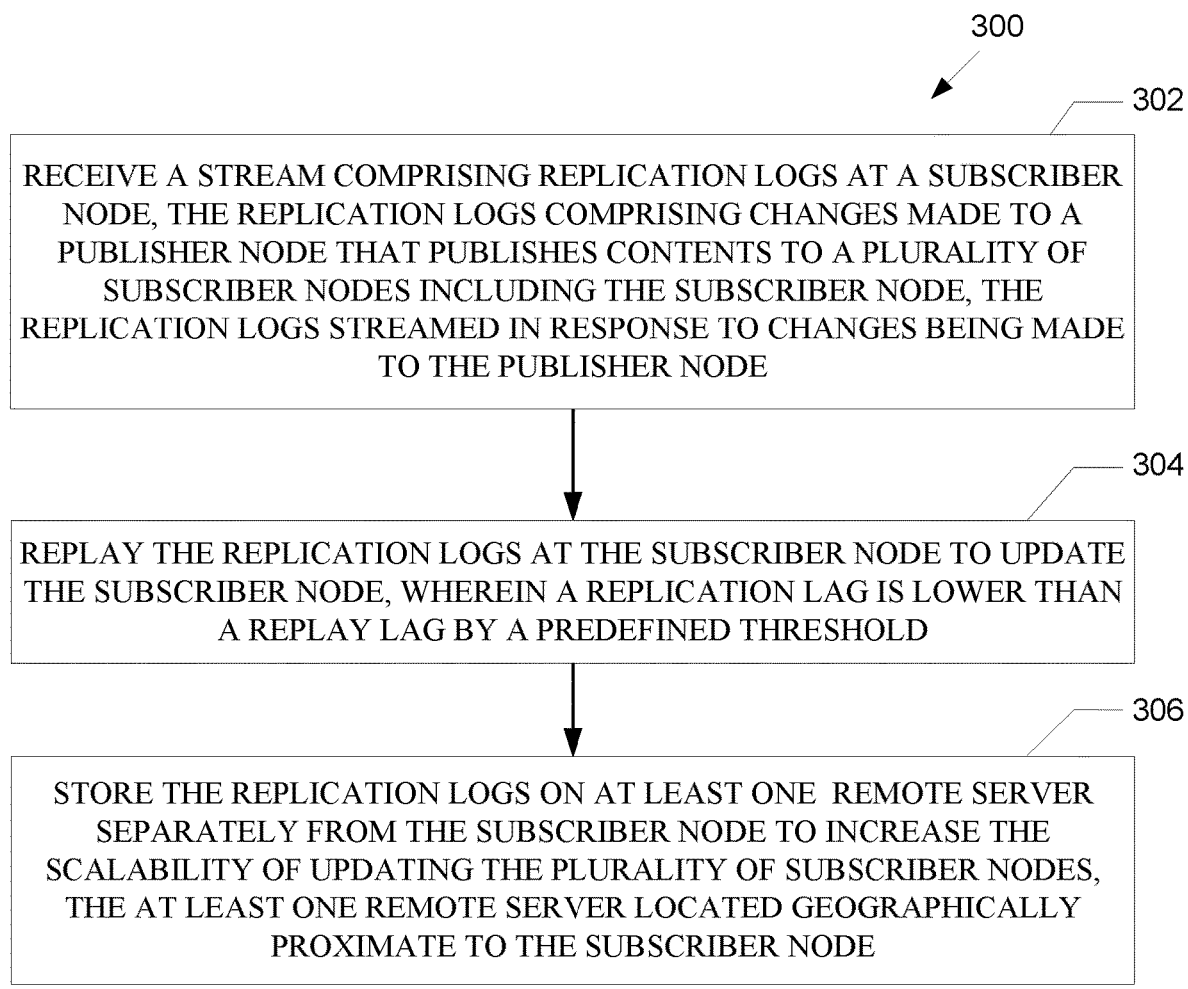
FIG. 3 illustrates an example flow diagram for scaling a network security policy manager.

FIG. 3 illustrates an example flow diagram (e.g., process 300) for scaling a network security policy manager. For explanatory purposes, the example process 300 is described herein with reference to FIGS. 1 and 2. Further, for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed. For purposes of explanation of the subject technology, the process 300 will be discussed in reference to FIGS. 1 and 2.

At block 302, a stream is received at a subscriber node that comprises replication logs. The replication logs may include changes made to a publisher node that publishes contents to a plurality of subscriber nodes including the subscriber node. The replication logs may be streamed in response to changes being made to the publisher node. At block 304, the replication logs are replayed at the subscriber node (e.g., replay the replication logs) to update the subscriber node. A replication lag may be lower than a replay lag by a predefined threshold. At block 306, the replication logs are stored on at least one remote server separately from the subscriber node to increase the scalability of updating the plurality of subscriber nodes. At least one remote server may be located geographically proximate to the subscriber node to reduce network bandwidth.

In an implementation, a stream of configuration data is received at any of the subscriber nodes 130, 140, 230, 240, 250, 260, 270, which includes replication logs. For example, the replication logs may include changes made to a publisher node (e.g., publisher nodes 110, 210). The replication logs may be streamed as soon as changes are made to the publisher node. The replication logs may be replayed at any of the subscriber nodes 130, 140, 230, 240, 250, 260, 270 to update the relevant subscriber node. For example, a replication lag may be significantly lower than a replay lag. The replication logs may be stored on a remote server separately from the subscriber nodes 130, 140, 230, 240, 250, 260, 270. The remote server may be located geographically proximate to the subscriber node to reduce network bandwidth.

According to an aspect, the process 300 further includes partitioning tables (e.g., partition tables) in a configuration database, the configuration database comprising the replication logs. According to an aspect, the process 300 further includes evaluating indexes on the configuration database to reduce bottlenecks.

According to an aspect, the process 300 further includes updating in real time write ahead logs of the subscriber node to reflect the changes to the publisher node. According to an aspect, the process 300 further includes referencing a local copy of database logs at the subscriber node prior to querying a publisher database.

According to an aspect, the process 300 further includes replaying the replication logs at a local configuration database of the subscriber node. According to an aspect, changes to the publisher node are reflected in real-time on write ahead logs (WALs) of the subscriber node.

Figure 4:
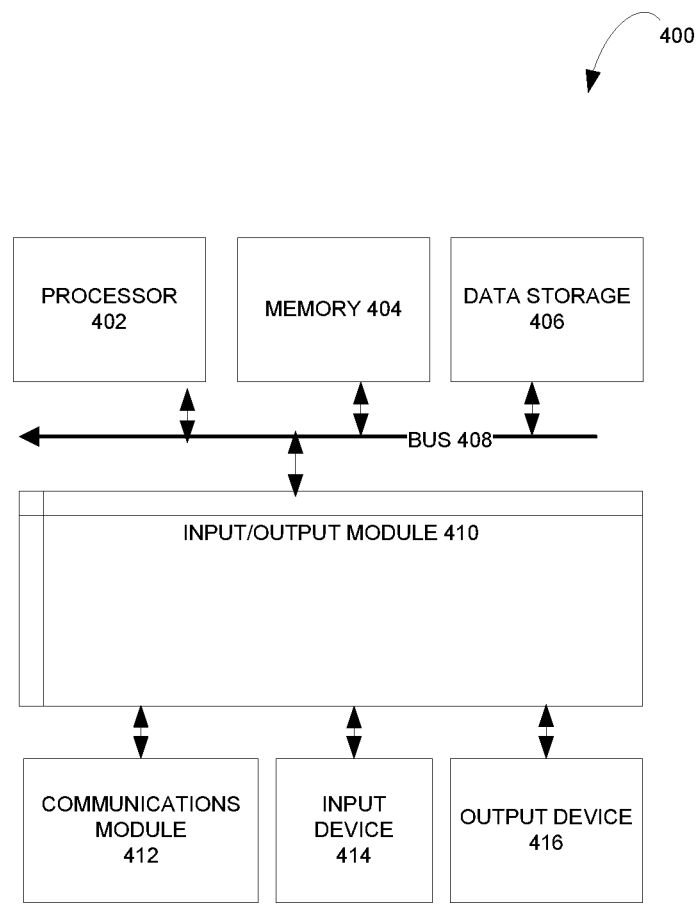
FIG. 4 is a block diagram illustrating an example computer system with which aspects of the subject technology may be implemented.

FIG. 4 is a block diagram illustrating an exemplary computer system 400 with which aspects of the subject technology may be implemented. In certain aspects, the computer system 400 may be implemented using hardware or a combination of software and hardware, either in a dedicated server, integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, for example, code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer-readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, the input/output module 410 is configured to connect to a plurality of devices, such as an input device 414 and/or an output device 416. Exemplary input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 416 include display devices such as an LCD (liquid crystal display) monitor, for displaying information to the user.

According to one aspect of the present disclosure, the devices and systems can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in the main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium (e.g., a non-transitory machine-readable storage medium encoded with instructions executable by at least one hardware processor of a network device) can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method comprising:
   receiving, at a subscriber node from a remote server, a stream comprising replication logs, the replication logs comprising changes made to configuration data at a publisher node that publishes contents to a plurality of subscriber nodes including the subscriber node, the replication logs streamed in response to the changes made at the publisher node,
   wherein the subscriber node comprises a network security policy manager that enforces a security policy with respect to network access,
   wherein the configuration data comprises authentication information to authenticate devices by the network security policy manager, and
   wherein the remote server is separate from the publisher node and stores the replication logs for redundancy;
   replaying the replication logs at the subscriber node to update configuration data at the subscriber node to maintain consistency with changed configuration data comprising the authentication information to authenticate devices by the network security policy manager, the changed configuration data being according to the changes made at the publisher node, wherein the replaying of the replication logs at the subscriber node updates a local configuration database of the subscriber node, and applies the changes made to the configuration data as the changes are made at the publisher node without waiting for periodic triggers; and referencing local copies of the replication logs at the subscriber node prior to querying the publisher node by the subscriber node.

2. The method of claim 1, further comprising:
partitioning tables in a configuration database, the configuration database comprising the replication logs.

3. The method of claim 1, wherein the replication logs replayed at the subscriber node are local copies of the replication logs sent by the publisher node and retrieved by the subscriber node from the remote server.

4. The method of claim 1, wherein the network security policy manager is part of a cluster of network security policy managers, the plurality of subscriber nodes comprising the cluster of network security policy managers.

5. A subscriber node comprising:
a processor; and
a non-transitory storage medium storing instructions executable on the processor to:
receive, at the subscriber node from a remote server, a stream comprising replication logs, the replication logs comprising changes made to configuration data at a publisher node that publishes contents to a plurality of subscriber nodes including the subscriber node, the replication logs streamed in response to the changes being made at the publisher node,
wherein the subscriber node comprises a network security policy manager that enforces a security policy with respect to network access,
wherein the configuration data comprises authentication information to authenticate devices by the network security policy manager, and
wherein the remote server is separate from the publisher node and stores the replication logs to provide redundancy;
replay the replication logs at the subscriber node to update local configuration data at the subscriber node to maintain consistency with changed configuration data comprising the authentication information to authenticate devices by the network security policy manager, the changed configuration data being according to the changes made at the publisher node, wherein the replaying of the replication logs at the subscriber node updates a local configuration database of the subscriber node, and applies the changes made to the configuration data as the changes are made at the publisher node without waiting for periodic triggers; and
reference local copies of the replication logs at the subscriber node prior to querying the publisher node by the subscriber node.

6. The subscriber node of claim 5, wherein the instructions are executable on the processor to:
partition tables in a configuration database, the configuration database comprising the replication logs.

7. The subscriber node of claim 5, wherein the replication logs replayed at the subscriber node are local copies of the replication logs sent by the publisher node and retrieved by the subscriber node from the remote server.

8. The subscriber node of claim 5, wherein the network security policy manager is part of a cluster of network security policy managers, the plurality of subscriber nodes comprising the cluster of network security policy managers.

9. A non-transitory machine-readable storage medium comprising instructions that upon execution cause a subscriber node to:
receive, at the subscriber node from a remote server, a stream comprising replication logs, the replication logs comprising changes made to configuration data at a publisher node that publishes contents to a plurality of subscriber nodes including the subscriber node, the replication logs streamed in response to the changes being made at the publisher node,
wherein the subscriber node comprises a network security policy manager that enforces a security policy with respect to network access,
wherein the configuration data comprises authentication information to authenticate devices by the network security policy manager, and
wherein the remote server is separate from the publisher node and stores the replication logs for redundancy;
replay the replication logs at the subscriber node to update local configuration data at the subscriber node to maintain consistency with changed configuration data comprising the authentication information to authenticate devices by the network security policy manager, the changed configuration data being according to the changes made at the publisher node, wherein the replaying of the replication logs at the subscriber node updates a local configuration database of the subscriber node, and applies the changes made to the configuration data as the changes are made at the publisher node without waiting for periodic triggers; and
reference local copies of the replication logs at the subscriber node prior to querying the publisher node by the subscriber node.

10. The non-transitory machine-readable storage medium of claim 9, wherein the instructions upon execution cause the subscriber node to:
partition tables in a configuration database, the configuration database comprising the replication logs.

11. The non-transitory machine-readable storage medium of claim 9, wherein the replication logs replayed at the subscriber node are local copies of the replication logs sent by the publisher node and retrieved by the subscriber node from the remote server.

12. The non-transitory machine-readable storage medium of claim 9, wherein the network security policy manager is part of a cluster of network security policy managers, the plurality of subscriber nodes comprising the cluster of network security policy managers.

* * * * *